United States Patent
Yamamoto et al.

(10) Patent No.: US 9,858,926 B2
(45) Date of Patent: Jan. 2, 2018

(54) DIALOG MODEL FOR CONTROLLING ENVIRONMENTAL COMFORT

(71) Applicant: DENSO CORPORATION, Kariya, Aichi-pref. (JP)

(72) Inventors: Mitsuo Yamamoto, Shibuya-ku (JP); Satoshi Kondo, Shibuya-ku (JP); Ryuichi Suzuki, Kariya (JP); Naoyori Tanzawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/038,743

(22) PCT Filed: Nov. 24, 2014

(86) PCT No.: PCT/JP2014/005872
§ 371 (c)(1),
(2) Date: May 24, 2016

(87) PCT Pub. No.: WO2015/079669
PCT Pub. Date: Jun. 4, 2015

(65) Prior Publication Data
US 2016/0379634 A1    Dec. 29, 2016

(30) Foreign Application Priority Data

Nov. 26, 2013 (JP) .................. 2013-243858

(51) Int. Cl.
G10L 15/00 (2013.01)
G10L 15/22 (2006.01)
G10L 15/18 (2013.01)

(52) U.S. Cl.
CPC .......... *G10L 15/22* (2013.01); *G10L 15/1822* (2013.01); *G10L 2015/223* (2013.01); *G10L 2015/228* (2013.01)

(58) Field of Classification Search
USPC .................................. 704/231–257, 270–275
See application file for complete search history.

(56) References Cited

U.S. PATENT DOCUMENTS

| 4,493,100 A | * | 1/1985 | Moriyama | ......... B60H 1/00757 236/1 R |
| 8,106,750 B2 | * | 1/2012 | Cho | ....................... G08C 17/02 340/12.5 |

(Continued)

FOREIGN PATENT DOCUMENTS

JP    2007286136 A    11/2007

*Primary Examiner* — Jesse Pullias
(74) *Attorney, Agent, or Firm* — Harness, Dickey & Pierce, P.L.C.

(57) ABSTRACT

A control device includes: a storage that stores a dialog model in which a question to a user, a reply candidate to the question from the user and a control content of each electronic device are associated with an input query from the user; an acquirer that acquires environmental data in a surrounding of the user; a calculator that, based on the environmental data, calculates environment predicted data to predict environment in the surrounding of the user after elapse of a predetermined period of time in cases where each control content corresponding to the input query is executed; and a question selector that selects a question corresponding to the control content that maximizes data indicative of a degree of comfort of the surrounding environment of the user in cases where each control is executed based on the environment predicted data.

13 Claims, 9 Drawing Sheets

| INPUT QUERY | SPEECH COMMAND | STANDARD QUERY |
|---|---|---|
| TURN AIR CONDITIONER ON | AIR CONDITIONER / ON | — |
| TURN REAR AIR CONDITIONER OFF | AIR CONDITIONER / BACK AIR BLOW / OFF | — |
| ... | ... | ... |
| IT'S HOT | — | IT'S HOT |
| DAMN HOT! | — | IT'S HOT |
| IT'S DEADLY HOT | — | IT'S HOT |
| ... | ... | ... |

(56) References Cited

U.S. PATENT DOCUMENTS

| | | | | |
|---|---|---|---|---|
| 8,306,825 B2* | 11/2012 | Nakashima | ............ | G10L 13/00 |
| | | | | 704/273 |
| 8,670,018 B2* | 3/2014 | Cunnington | ........... | G06Q 10/10 |
| | | | | 348/14.08 |
| 8,963,987 B2* | 2/2015 | Byun | .................... | H04N 7/147 |
| | | | | 348/14.08 |
| 2003/0130852 A1* | 7/2003 | Tanaka | .................... | H04M 1/05 |
| | | | | 704/275 |
| 2006/0074684 A1* | 4/2006 | Yoshida | ................ | G01C 21/36 |
| | | | | 704/271 |
| 2009/0150160 A1* | 6/2009 | Mozer | .................... | G06F 3/011 |
| | | | | 704/275 |

* cited by examiner

FIG. 2

| INPUT QUERY | SPEECH COMMAND | STANDARD QUERY |
|---|---|---|
| TURN AIR CONDITIONER ON | AIR CONDITIONER / ON | — |
| TURN REAR AIR CONDITIONER OFF | AIR CONDITIONER / BACK AIR BLOW / OFF | — |
| ... | ... | ... |
| IT'S HOT | — | IT'S HOT |
| DAMN HOT! | — | IT'S HOT |
| IT'S DEADLY HOT | — | IT'S HOT |
| ... | ... | ... |

DIALOG MODEL FOR CONTROLLING ENVIRONMENTAL COMFORT

CROSS REFERENCE TO RELATED APPLICATIONS

This application is a U.S. National Phase Application under 35 U.S.C. 371 of International Application No. PCT/JP2014/005872 filed on Nov. 24, 2014 and published in Japanese as WO 2015/079669 A1 on Jun. 4, 2015. This application is based on and claims the benefit of priority from Japanese Patent Application No. 2013-243858 filed on Nov. 26, 2013. The entire disclosures of all of the above applications are incorporated herein by reference.

TECHNICAL FIELD

The present disclosure relates to a control device for controlling one or more electronic devices, in particular, relates to a control device for controlling an in-vehicle device such as an air conditioner and a power window, through the interaction with a user.

BACKGROUND ART

In the past, a control device for operating various in-vehicle devices such as an air conditioner and an audio device by speech input by a user is proposed. For example, a device disclosed in Patent Literature 1 is provided with plural speech recognition dictionaries in which vocabularies dedicated to a control target device are registered. The described technology improves the recognition rate over the contents of utterance by selecting a speech recognition dictionary dedicated to the source of information to which an utterer views and listens, and by performing speech recognition using the selected dictionary.

PRIOR ART LITERATURES

Patent Literature

Patent Literature 1: JP2007-286136A

SUMMARY OF INVENTION

In short, the technology disclosed in Patent Literature 1 specifies the user's intention of what kind of operation to be performed to which device, based on the source of the information which the utterer views and listens to and the meaning of each vocabulary, and performs the operation. Accordingly, even if the contents of utterance by the user are not as clear as the so-called speech command, it is possible to perform a suitable operation responding to the operation intention of the user. However, in the technology disclosed in Patent Literature 1, when an utterer intends to control a device unrelated to the source of the information which the utterer views and listens to, it is difficult to understand the operation intention of the utterer correctly and to perform suitable control of the device.

Since a user may not know what kind of function each in-vehicle device has, or how to operate the in-vehicle device in order to realize each function, the operation intention of the user included in the utterance may become ambiguous. In such a case, it is difficult to understand the operation intention of the user from an utterance and to control the device exactly.

The present disclosure is made in view of the foregoing and has an object to provide a control device that can control an electronic device in accordance with an intention of a user.

In an aspect of the present disclosure, a control device for controlling at least one electronic device in response to an input query from a user comprising: an input query receiver that receives the input query from the user; a dialog model storage that stores a dialog model in which a question to the user, a reply candidate to the question from the user and a control content of each electronic device are associated with the input query; an environmental data acquirer that acquires environmental data in a surrounding of the user; an environment predicted data calculator that, based on the environmental data, calculates environment predicted data to predict environment in the surrounding of the user after elapse of a predetermined period of time in cases where each control content associated with the question corresponding to the input query and the reply candidate in the dialog model is executed; a question selector that, based on the environment predicted data, calculates data indicative of a degree of comfort of a surrounding environment of the user in cases where each control content is executed, and with reference to the dialog model stored in the dialog model storage, selects a question corresponding to the control content that maximizes the data indicative of the degree of comfort; an outputter that outputs the question selected by the question selector; and a control signal transmitter that transmits a control signal for instructing the electronic device to execute the control content according to a user's reply to the outputted question.

In this configuration, when an input query is received from a user, an actuation (control content) predicted to increase the comfort of the surrounding environment of a user is specified, and a question associated with the control content is selected and outputted to the user who has inputted the query. Then, the electronic device is operated in response to the user's reply to the outputted question. Usually, the user is considered to desire the surrounding environment to become comfortable. Accordingly, even if a clear operation instruction is not included in the input query by the user, the operation which makes the surrounding environment of the user more comfortable can be specified as the operation intention of the user to control the in-vehicle device. It should be noted that the environmental data is measurable data indicative of environment conditions, such as temperature, humidity, and a pollen concentration, for example, and that the environment predicted data is a predicted value of the environmental data. As for a concrete numerical value of the environmental data and environment predicted data, a degree of comfort for a human body in the environment condition can be evaluated by a numerical value.

In another aspect of the present disclosure, a control device for controlling at least one electronic device in response to an input query from a user comprises: an input query receiver that receives the input query from the user; a dialog model storage that stores a dialog model in which a question to the user, a reply candidate to the question from the user including cancellation of the dialog for controlling the electronic device, and a control content to each electronic device are associated with the input query; an environmental data acquirer that acquires environmental data in a surrounding of the user; an environment predicted data calculator that, based on the environmental data, calculate environment predicted data to predict environment in the surrounding of the user after elapse of a predetermined period of time in cases where each control content associated with a question corresponding to the input query and the reply candidate in the dialog model is executed; a question selector that calculates data indicative of a degree of comfort of the surrounding environment of the user in cases where each control content is executed, based on the environment predicted data, data indicative of reply simplicity to each question from the user, and data indicative of lowness of probability of the cancellation stored in the dialog model in association with the question, and that selects a question corresponding to the control content that maximizes a sum of the data indicative of the degree of comfort, the data indicative of the reply simplicity, and the data indicative of the lowness of the probability of the cancellation; an output unit that outputs the question selected by the question selector; and a control signal transmitter that transmits a control signal for instructing the electronic device to execute the control content according to a user's reply to the outputted question.

In this configuration, the question to be presented to a user is determined by comprehensive evaluation of different indices including the degree of comfort of the surrounding environment of the user, the reply simplicity to the question, and the probability of the cancellation of the dialog. Accordingly, it is possible to highly accurately determine appropriateness of the question to be presented to the user.

In an aspect of the present disclosure, a control method for controlling at least one electronic device in response to an input query from a user comprises the steps of: receiving the input query from the user; acquiring environmental data in a surrounding of the user; based on the environmental data, calculating environment predicted data to predict environment in the surrounding of the user after elapse of a predetermined period of time in cases where each control content o is executed, wherein a dialog model storage stores a dialog model in which a question to the user, a reply candidate to the question, and the control content are associated with the input query; based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage; outputting the question selected by the question selector; and transmitting a control signal for instructing the electronic device to execute the control content according to a user's reply to the outputted question.

In this method, it is possible to specify an operation intention of the user through a suitable dialog, and to control the electronic device to make the surrounding environment of the user more comfortable. It is also possible to apply each configuration of the control device described above to the control method in the present disclosure.

In an aspect of the present disclosure, a program causes a computer to execute the following steps for controlling at least one electronic device in response to an input query by a user: receiving the input query from the user; acquiring environmental data in a surrounding of the user; based on the environmental data, calculating environment predicted data to predict environment in the surrounding of the user after elapse of a predetermined period of time in cases where each control content of the electronic device is executed, wherein a dialog model storage stores a dialog model in which a question to the user, a reply candidate to the question, and the control content are associated with the input query; based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage outputting the question selected by the question selector; and transmitting a control signal for instructing the electronic device to execute the control content according to a user's reply to the outputted question.

In this program, it is possible to specify an operation intention of the user through a suitable dialog, and to control the electronic device to make the surrounding environment of the user more comfortable. It is also possible to apply each configuration of the control device described above to the program described above. The program described above may be provided in a form stored in a computer-readable non-transitory storage medium or provided via a telecommunication line.

According to the above described control device, control method and program, the control content for improving the comfort of the surrounding environment of a user is specified, and a question associated with the control content is selected and outputted to the user who has inputted the query. Therefore, it is possible to specify the operation intention of the user through the dialog, and to control the electronic device so that the surrounding environment of the user becomes more comfortable.

BRIEF DESCRIPTION OF THE DRAWINGS

FIG. 2 is a drawing illustrating an example of a conversion chart stored in an input query conversion chart storage;

EMBODIMENTS FOR CARRYING OUT INVENTION

Hereinafter, a control device of embodiments of the present disclosure is explained, referring to drawings.

First Embodiment

Figure 1:
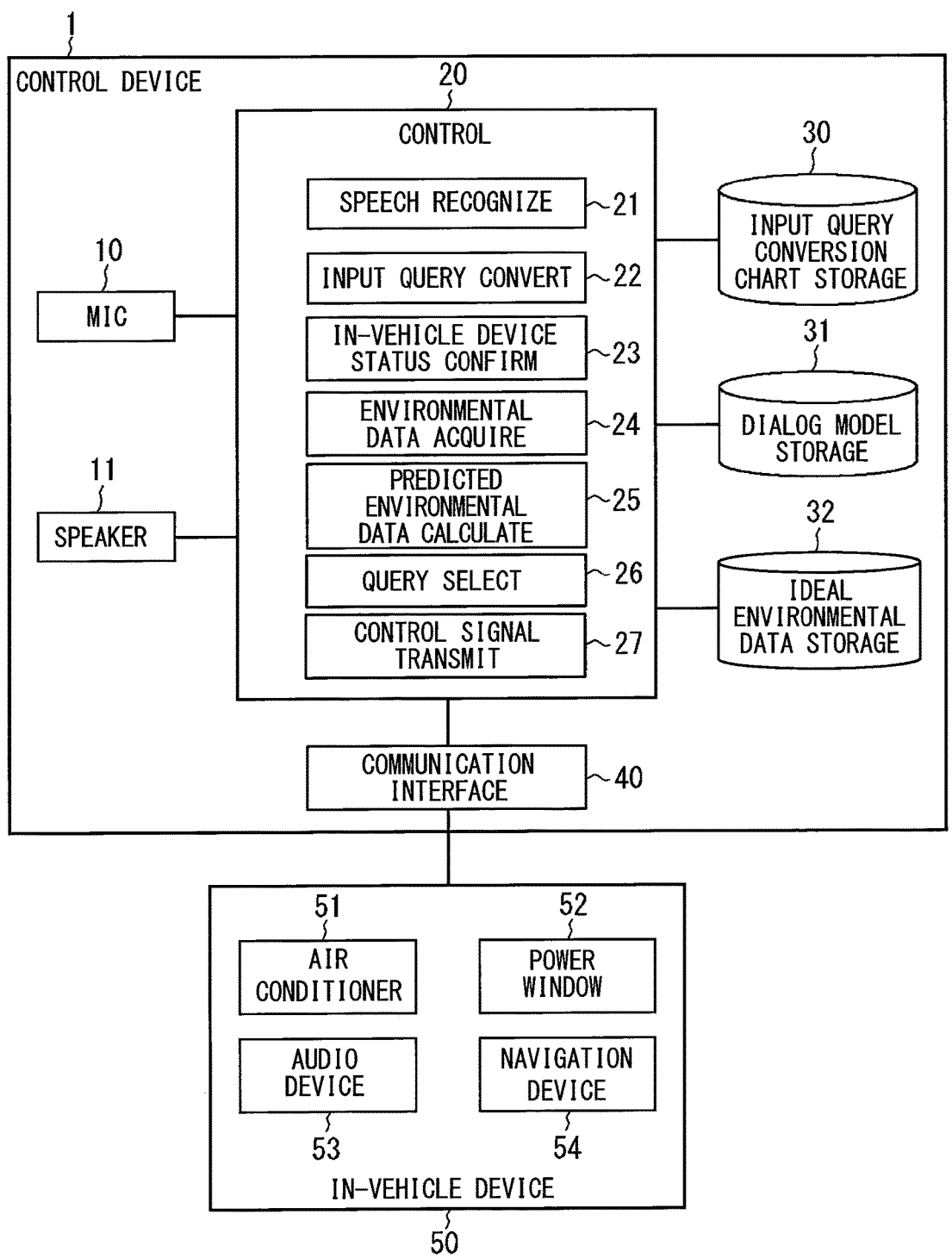
FIG. 1 is a block diagram illustrating a configuration of a control device of a first embodiment.

FIG. 1 illustrates a configuration of a control device 1 of the first embodiment. The control device 1 is coupled to an in-vehicle device 50 including an air conditioner 51, a power window 52, an audio device 53, and a navigation device 54. The control device 1 is mounted in a vehicle, transmits a control signal to the in-vehicle device 50, and controls the in-vehicle device 50. The in-vehicle device 50 corresponds to an example of an electronic device in the present disclosure.

As a configuration for outputting a question to a user in response to a speech query inputted by a user, and for clarifying the intention of the user regarding control of the in-vehicle device through a speech dialog with the user, the control device 1 of the present embodiment is provided with a microphone 10, a speaker 11, a controller 20, an input query conversion chart storage 30, a dialog model storage 31, an ideal environmental data storage 32, and a communication interface 40. The microphone 10 outputs an utterance by a user to the controller 20. Regarding the utterance by a user inputted via the microphone 10 as an input query for operating the in-vehicle device 50, the controller 20 selects a question for clarifying the operation intention of the user, with reference to the input query conversion chart storage 30, the dialog model storage 31, and the ideal environmental data storage 32. Responding to a reply inputted via the microphone 10 by the user to the question, the controller 20 transmits a control signal to the in-vehicle device 50 via the communication interface 40. The speaker 11 outputs the question selected by the controller 20 to the user by speech. The microphone 10 corresponds to an example of an input query receiver in the present disclosure. The speaker 11 corresponds to an example of an output unit in the present disclosure.

The controller 20 is provided with a speech recognizer 21, an input query convertor 22, an in-vehicle-device status confirmation unit 23, an environmental data acquirer 24, an environment predicted data calculator 25, a question selector 26, and a control signal transmitter 27. These functions provided by the controller 20 are realized by executing a program stored in an ROM, etc. (not shown). The program which realizes the functions of the controller 20 is also included in the spirit and scope of the present disclosure.

The speech recognizer 21 performs speech recognition on the inputted utterance by a user. When the recognized user's utterance corresponds to a speech command, the speech recognizer 21 outputs the speech command to the control signal transmitter 27. The speech command is a speech input which can specify by itself a control target device and control contents clearly. The control signal transmitter 27 transmits a control signal corresponding to the speech command to the in-vehicle device 50 via the communication interface 40. The speech recognizer 21 outputs the contents of recognition to the input query convertor 22, when the recognized user's utterance does not correspond to a speech command. The input query convertor 22 converts the user's utterance not corresponding to a speech command (input query) into a speech command or a standard query with reference to the data stored in the input query conversion chart storage 30. The input query convertor 22 outputs the speech command converted from the input query to the control signal transmitter 27, and outputs the standard query converted from the input query to the question selector 26. In this way, in the present embodiment, the speech of a user is divided into three categories: (a) a speech command which has clear meaning and clear operation intention, (b) a speech query which has clear operation intention although not having direct meaning as compared with the speech command, and (c) a speech query which is ambiguous both in meaning and operation intention. As for (b), the control device 1 converts the speech query into a speech command, and as for (c), the question selector 26 of the control device 1 selects a question to be outputted to a user, in order to guide the user to suitable device control through a speech dialog.

FIG. 2 illustrates an example of an input query conversion chart stored in the input query conversion chart storage 30. For example, from input queries "turn the air conditioner on" and "turn the rear air conditioner off", the operation intention of the user (the control target device and the contents of operation) can be specified uniquely. Therefore, these input queries are associated with speech commands "an air conditioner/ON" and "an air conditioner/rear air blow/OFF", respectively. On the other hand, as for input queries "it's hot", "damn hot!", and "it's deadly hot", for example, there are several options, such as opening a window and turning an air conditioner on, and it is difficult to specify the operation intention of the user. Accordingly, it is difficult to associate them with a speech command; alternatively, they are associated with a standard query "it is hot." The standard query is a typical expression of plural input queries with the same meaning.

Returning to FIG. 1, the in-vehicle-device status confirmation unit 23 confirms the control states (ON and OFF, a set temperature, an audio volume, etc.) of the in-vehicle device 50, and outputs them to the question selector 26. From the dialog model stored in the dialog model storage 31, the question selector 26 extracts the actuation (control contents) corresponding to a standard query, based on the state of the in-vehicle device 50, and outputs it to the environment predicted data calculator 25.

Figure 3:
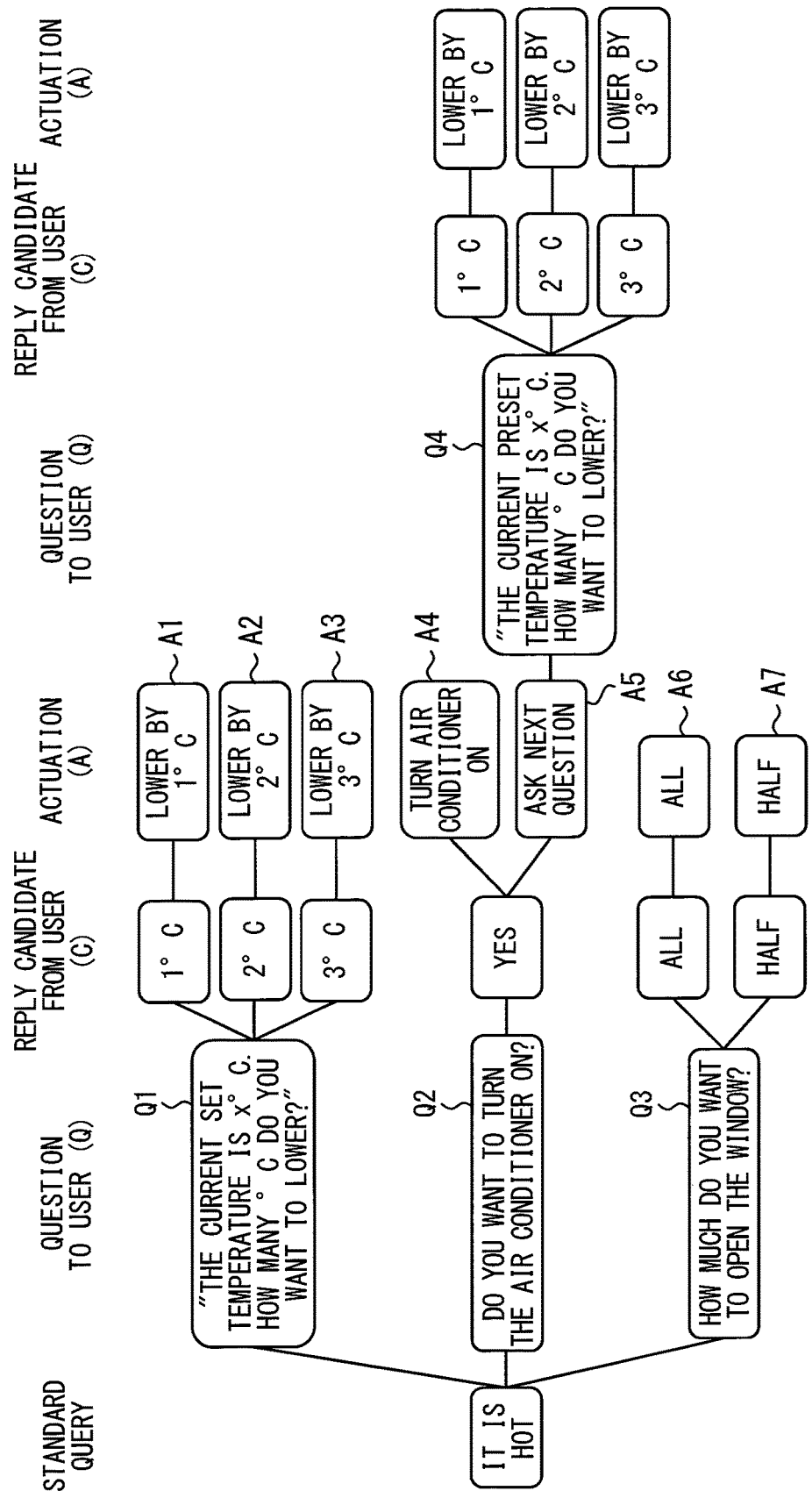
FIG. 3 is a drawing illustrating an example of a dialog model stored in a dialog model storage of the first embodiment.

FIG. 3 illustrates an example of the dialog model stored in the dialog model storage 31. The dialog model is the database which associates and lists the path from the standard query to the actuation (control contents) of the in-vehicle device with a question to a user and reply candidates from the user to it. As illustrated in FIG. 3, to the standard query "it is hot", three questions to a user are associated, such that Q1 "The current set temperature is x degrees. How many degrees do you want to lower?", Q2 "Do you want to turn the air conditioner on?", and Q3 "How much do you want to open the window?", and the three questions are associated with reply candidates expected from the user to each of the questions. Each of the reply candidates from the user is further associated with the actuation.

As described above, in order to clarify the operation intention of the user, the control device 1 presents a question to the user who has inputted the speech query, and performs a speech dialog with the user. Accordingly, it is important how an appropriate question is presented to the user. In the present embodiment, "an appropriate question" is construed as a question that can lead to the user intended result finally, and such a question is selected. More specifically, a question finally driving the operation which makes the surrounding environment of the user comfortable is selected. This is because it is usually conceivable that the user intends to perform the operation to make the surrounding environment more comfortable.

Returning to FIG. 1 again, the environmental data acquirer 24 acquires a sensing data from a thermometer, a hygrometer, a smell sensor, a pollen sensor, etc. (not shown), and outputs the acquired sensing data to the environment predicted data calculator 25. Based on the sensing data acquired by the environmental data acquirer, the environment predicted data calculator 25 calculates environment predicted data after elapse of a predetermined period of time in cases where the actuation extracted by the question selector 26 is executed. The environment predicted data is a predicted value of data indicative of a vehicle internal environment. The environment predicted data may be calculated with a predetermined formula. Alternatively, a central value, such as a mode, may be used based on a statistical data.

With reference to the ideal environmental data storage 32, the question selector 26 calculates data indicative of a degree of user comfort of a surrounding environment using a distance between the environment predicted data and the ideal environmental data, and selects a question corresponding to the actuation which maximizes the data indicative of the degree of comfort. The question selector 26 also outputs the question corresponding to the specified actuation to the speaker 11 as the speech data.

Here, the ideal environmental data stored in the ideal environmental data storage 32 is a data indicative of a vehicle internal environment that is estimated to be comfortable for the body of a user. The ideal environmental data is expressed using one or more parameters such as temperature, humidity, a numerical value indicative of the strength of a smell, a pollen concentration, and an air quantity. It should be noted that some parameters such as a pollen concentration are important only in a specific season. Temperature and humidity estimated to be comfortable for the body of a user may change of season. Accordingly, the ideal environmental data stored in the ideal environmental data storage 23 may differ in the number of parameters and also in the numerical value of each parameter for every season. Corresponding to this fact, the kind of the environmental data acquired by the environmental data acquirer 24 and the kinds of the environment predicted data calculated by the environment predicted data calculator 25 may also differ depending on seasons.

Figure 4:
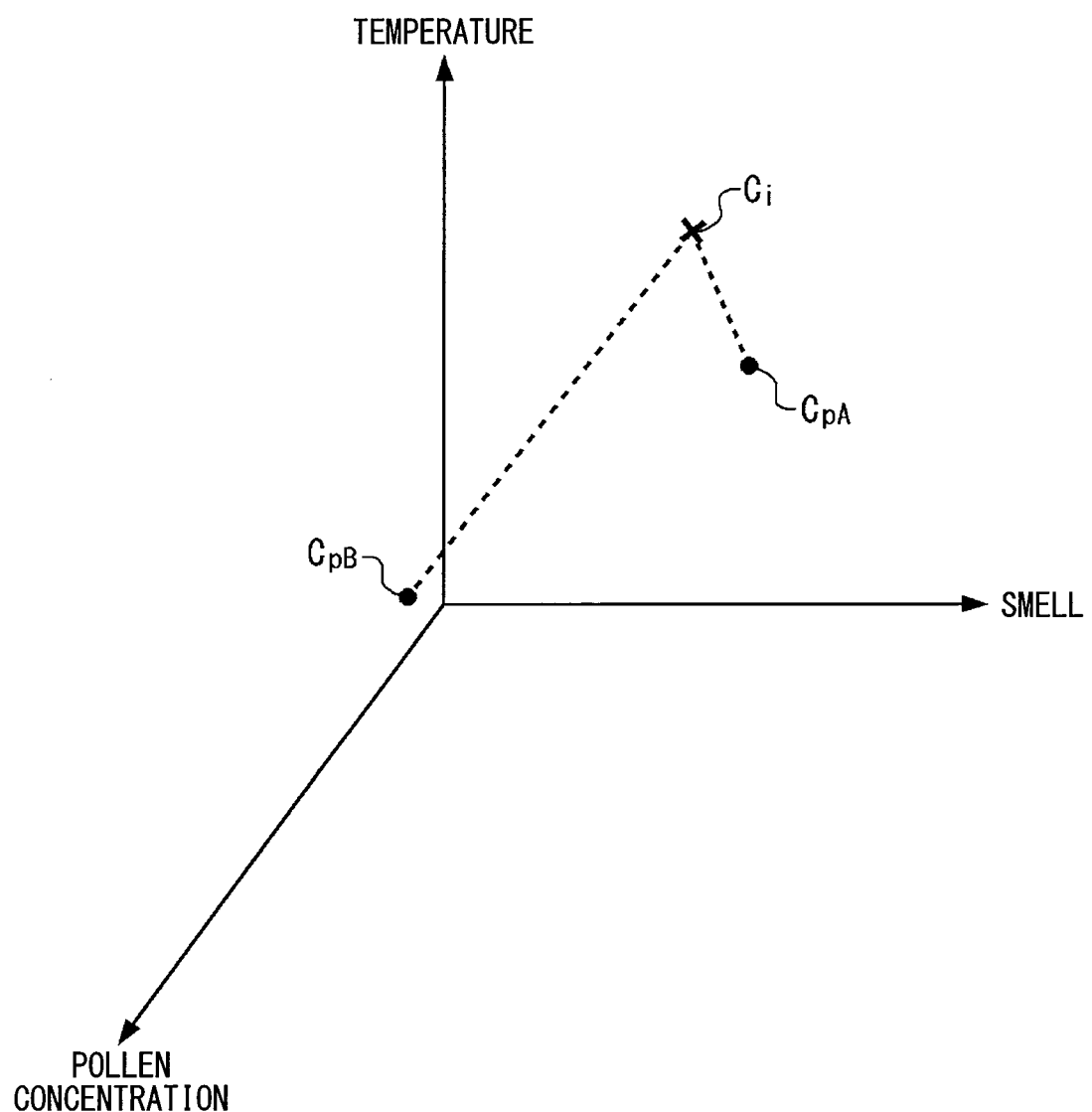
FIG. 4 is a drawing illustrating an example of ideal environmental data stored in an ideal environmental data storage, and an example of environment predicted data calculated by an environment predicted data calculator.

FIG. 4 illustrates an example of the ideal environmental data stored in the ideal environmental data storage 32 and the environment predicted data calculated by the environment predicted data calculator. The ideal environmental data $C_i$ illustrated in FIG. 4 is the ideal environmental data in April, and includes parameters of temperature, a smell, and a pollen concentration. $C_{pA}$ is the environment predicted data when an actuation A is executed, and $C_{pB}$ is the environment predicted data when an actuation B is executed. When $C_{pA}$ and $C_{pB}$ are compared, $C_{pA}$ is closer to $C_i$. This implies that when the actuation A is executed, the vehicle internal environment becomes more comfortable. That is, the data indicative of the degree of comfort also becomes larger in $C_{pA}$. Accordingly, the question selector 26 selects a question corresponding to the actuation A.

More specifically, the data indicative of the degree of comfort is expressed by $S_a(Q)$ which is calculated by the following expression.

$$S_a(Q) = \gamma / \{|C_p - C_i| + 1\} \qquad \text{<Expression 1>}$$

where $\gamma$ is a predetermined coefficient value, $C_p$ is environment predicted data, and $C_i$ is ideal environmental data.

Figure 5:
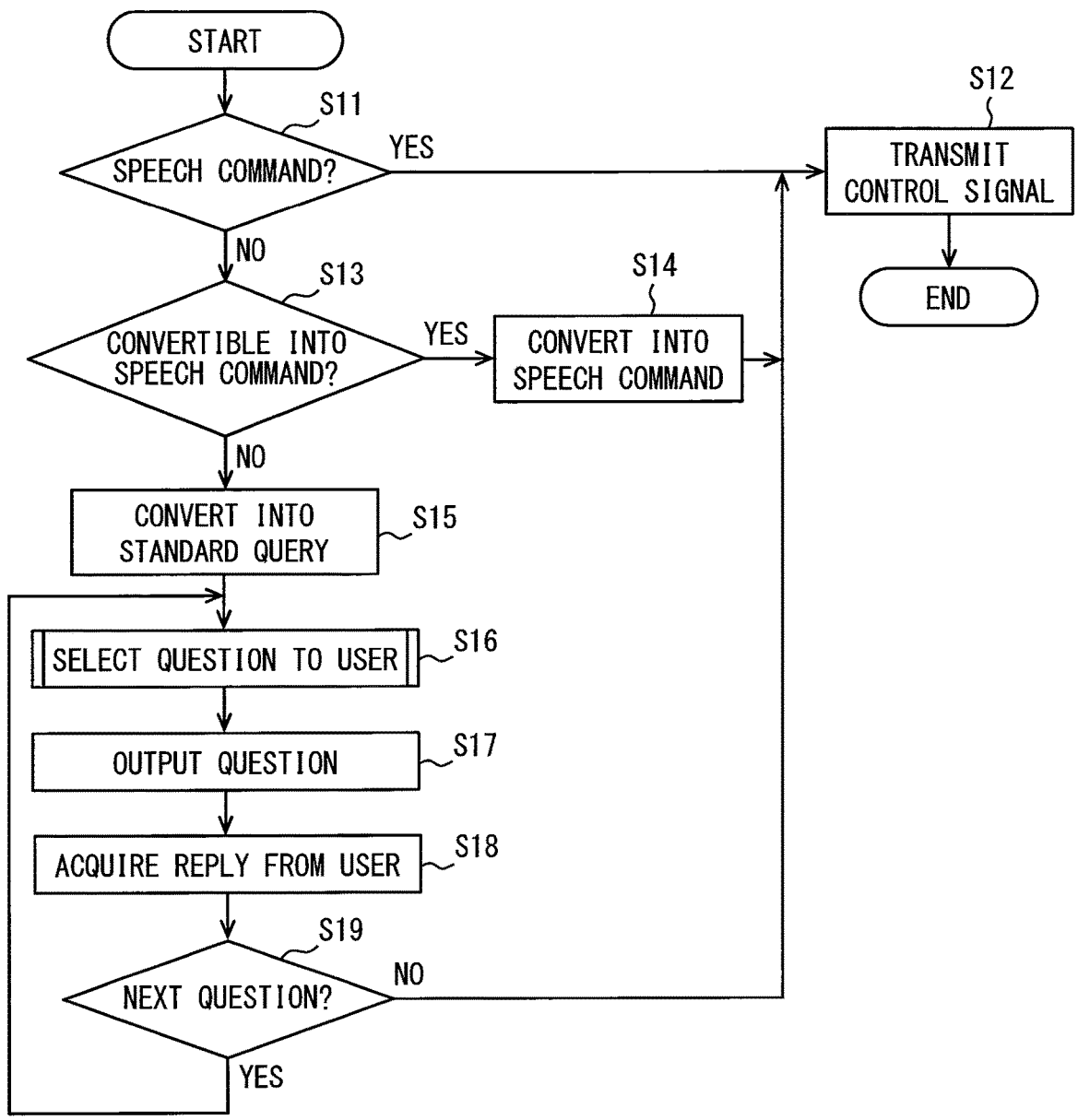
FIG. 5 is a flow chart illustrating an operation of the control device of the first embodiment.

Next, operation of the control device 1 of the first embodiment is explained. FIG. 5 is an operation flow chart of the control device 1. The control device 1 performs speech recognition processing on an input query by the user and determines whether the input query corresponds to a speech command (Step S11). When the input query by the user corresponds to a speech command (Yes at Step S11), the control device 1 transmits a control signal to the in-vehicle device 50 (Step S12). Even when the input query by the user does not correspond to a speech command (No at Step S11), if the use of the input query conversion chart enables conversion to a speech command (Yes at Step S13), the input query by the user is converted into a speech command (Step S14) and a control signal is transmitted.

When the utterance by the user cannot be converted into a speech command (No at Step S13), the control device 1 converts the input query by the user into a standard query (Step S15), and selects a question to be outputted to the user, in order to specify the operation intention of the user from the standard query (Step S16). The process at Step S16 will be described later. The question selected at Step S16 is outputted to the user (Step S17). Subsequently, a reply from the user is acquired (Step S18). When there is no next question (No at Step S19), the actuation to the in-vehicle device 50 is specified based on the acquired reply from the user, and a control signal is transmitted. When there is the next question (Yes at Step S19), the query selecting (Step S16) is repeated. In the above, a control signal may be transmitted to the in-vehicle device 50 (Step S12) based on the reply by the user acquired at Step S18, and subsequently, it may be determined whether there is the next question.

Figure 6:
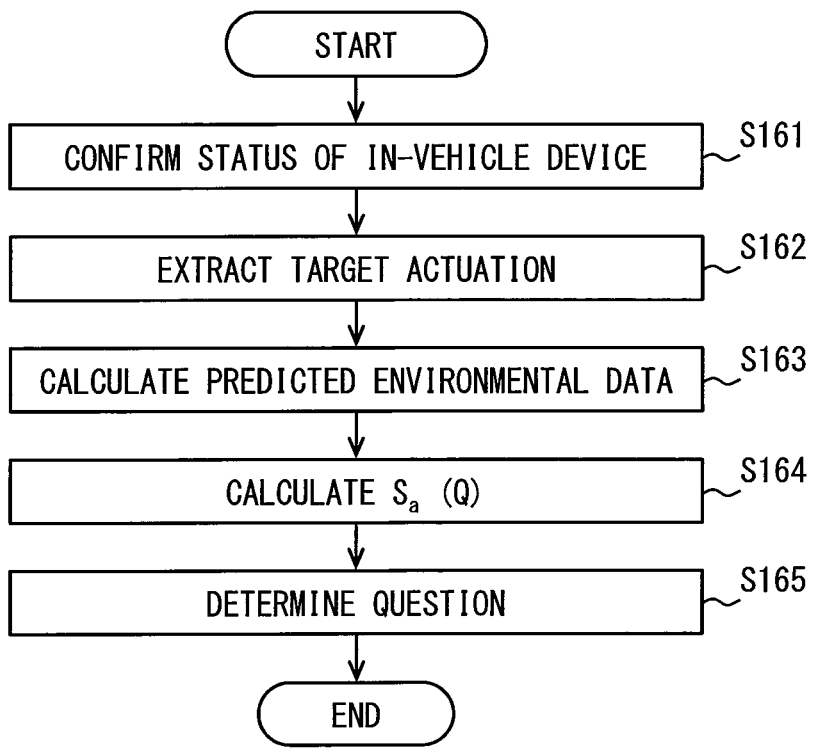
FIG. 6 is a flow chart illustrating the flow of query selecting by the control device of the first embodiment.

FIG. 6 illustrates the flow of the query selecting at Step S16 of FIG. 5. First, the control device 1 confirms the status of the in-vehicle device 50 (Step S161) and extracts a target actuation (Step S162). For example, in the event that the acquired standard query is "hot", when it is confirmed that the air conditioner is set as OFF at Step S161, the question "The set temperature is x degrees. How many degrees do you want to lower?" is unsuitable in the dialog model of FIG. 3. Accordingly, the path derived from this question is disregarded, and the actuations derived from the question "Do you want to turn the air conditioner on?" and the question "How much do you want to open the window?" are extracted.

Returning to FIG. 6, the control device 1 next calculates environment predicted data (Step S163) which is environmental data predicted to appear in response to each execution of the extracted actuation (Step S163), and calculates $S_a(Q)$ for each actuation (Step S164). Then, the control device 1 determines the question corresponding to the actuation having the largest calculated $S_a(Q)$ (Step S165), as a question to be outputted.

By the process from Step S161 to Step S165, the question to be outputted is selected from the dialog model as illustrated in FIG. 3. For example, when the acquired standard query is "hot", there are three corresponding questions Q1, Q2, and Q3 in FIG. 3. In this case, when the air conditioner is at an OFF state, the actuations A4-A7 which follow Q2 and Q3 are extracted. When it is assumed that $S_a(Q)$ of the actuations A4, A6, and A7 are 0.8, 0.5, and 0.3, respectively, the question Q2 corresponding to the actuation A4 is selected.

As explained above, when the input query by the user does not correspond to a speech command or it cannot be converted into a speech command, the control device 1 of the first embodiment calculates the environment predicted data for each actuation corresponding to the input query. Then, based on the distance between the environment predicted data and the ideal environmental data, the control device 1 calculates the $S_a(Q)$ value indicative of the degree of user comfort of the surrounding environment after the elapse of the predetermined period of time, and selects the question corresponding to the actuation which maximizes the $S_a(Q)$ value. Accordingly, even when it is difficult to convert the input query into a speech command, it is possible to specify the operation intention of the user, and to control the in-vehicle device so that the vehicle internal environment becomes more comfortable.

In the embodiment described above, the target actuations and questions are narrowed down according to the control status of the in-vehicle device. Accordingly, it is possible to output a more appropriate question to the user.

In the first embodiment, the question corresponding to the actuation which maximizes $S_a$ (Q) is determined as a question to be outputted. However, when plural $S_a$ (Q) values are calculated about one question (that is, when plural reply candidates and actuations are associated with one question), a question may be selected by comparison of a central value in consideration of the distribution state such as a mean value of the $S_a$ (Q) values. It is not necessary to perform the target actuation extraction process, and in this case, it is not necessary to confirm the status of the in-vehicle device in that case.

In the above embodiment, the ideal environmental data different on a season-by-season basis are stored in the ideal environmental data storage. Alternatively, the same ideal environmental data may be stored. Alternatively, the ideal environmental data different on a season-by-season basis may be stored such that the pollen concentration is included in the parameter only for a user suffering from pollen allergy.

In the first embodiment, the input query by the user is speech data. Alternatively, the input query by the user may be text data. In the above embodiment, the control device 1 controls an air conditioner or a power window. Alternatively, other in-vehicle devices such as an audio device and a navigation device may be controlled. Electronic devices other than the in-vehicle device may be controlled.

Second Embodiment

A control device of the second embodiment of the present disclosure will be explained. The control device of the second embodiment also has a dialog with a user by presenting a question in order to clarify the operation intention of the user. However, in the second embodiment, it is further taken into consideration whether the question does not impose a burden on the user, as an element of the appropriate question to be outputted to the user. A structure of the control device of the second embodiment is the same as that of the control device of the first embodiment. However, the question selector 26 of the control device of the second embodiment further calculates the data $S_d$ (Q) indicative of simplicity of a user's reply simplicity to the outputted question. The data $S_d$ (Q) indicative of simplicity of the reply to the question is an index indicative of whether the user can reply easily to the outputted question. A greater value thereof means that the burden on a user is smaller and the question is easier. Then, based on $S_a$ (Q) and $S_d$ (Q), the question Q which maximizes the sum of $S_a$ (Q) and $S_d$ (Q) is selected by the following equation.

$$Q = \mathrm{argmax}\{S_d(Q) + S_a(Q)\} \quad \text{<Expression 2>}$$

where $S_d$ (Q) is calculated by the following equation.

$$S_d(Q) = \alpha/C_n \times \beta/Q_n \quad \text{<Expression 3>}$$

In the above equation, $\alpha$ and $\beta$ are predetermined coefficient values, $C_n$ is the number of user reply candidates, and $Q_n$ is the total number of questions (including the question concerned) included in a path including the question. That is, as the number of reply candidates is greater, $S_d$ (Q) becomes smaller. This is because it is supposed that as the number of reply candidates increases, a user has to consider a greater number of things before replying. Specifically, a question which can be replied by "yes" or "no" leads to a greater $S_d$ (Q), and a question which can be replied with a high degree of freedom leads to a smaller $S_d$ (Q). The greater total number of questions leads to a smaller $S_d$ (Q). This is because the greater total number of questions increases the count of dialogs with a user.

With reference to FIG. 3, a concrete example of $S_d$ (Q) calculated by the question selector 26 is explained. For example, the question Q2 "Do you want to turn the air conditioner on?" has one reply candidate, and the total number of the questions in a path including Q2 is two of Q2 and Q4; accordingly, $S_d$ (Q) is given by $\alpha \cdot \beta/2$. On the other hand, the question Q3 "How much do you want to open the window?" has two reply candidates, and there is no question other than Q3 in the path of Q3 and the total number of the question is one; accordingly, $S_d$ (Q) is $\alpha \cdot \beta/2$.

Figure 7:
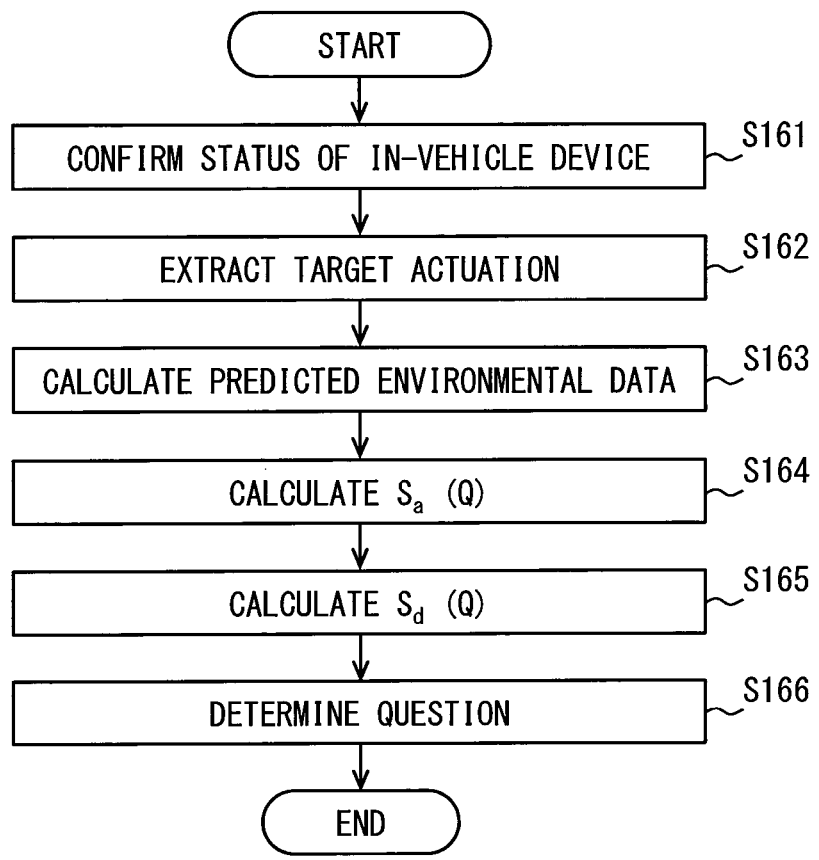
FIG. 7 is a flow chart illustrating the flow of query selecting by a control device of a second embodiment.

FIG. 7 illustrates the flow of query selecting processing in the second embodiment. The process from Step S161 to Step S164 is the same as in the first embodiment. The control device 2 of the second embodiment calculates $S_d$ (Q) at the subsequent Step S165, and selects a question Q at Step S166, based on $S_a$ (Q) and $S_d$ (Q).

For example, in the example of FIG. 3, when it is assumed that values of $S_a$ (Q) of A1 to A4, and A6 and A7 are 0.7, 0.8, 0.7, 0.8, 0.5, and 0.3, respectively, then, as for each of Q1, Q2, and Q3, $$Q = \mathrm{argmax}\{S_d(Q) + S_a(Q)\} \quad \text{<Expression 4>}$$

becomes $\alpha \cdot \beta/3 + 0.8\gamma$, $\alpha \cdot \beta/2 + 0.8\gamma$, and $\alpha \cdot \beta/2 + 0.5\gamma$. When $\alpha = \beta = \gamma = 1$, $\alpha \cdot \beta/2 + 0.8\gamma$ becomes the greatest. Therefore, Q2 is selected when the air conditioner is not on.

As explained above, the control device of the second embodiment calculates the data $S_d$ (Q) indicative of the simplicity of user reply to the outputted question, and selects the question Q based on $S_a$ (Q) and $S_d$ (Q). Therefore, it is possible to operate the in-vehicle device so as to make the vehicle internal environment more comfortable through a dialog, without imposing a burden on the user.

In the second embodiment, $S_d$ (Q) is calculated after $S_a$ (Q) is calculated. However, the order may be reversed, or $S_d$ (Q) may be stored in advance in the dialog model storage 31, in association with each question. Furthermore, in the embodiment described above, when $S_d$ (Q) is calculated, the number $C_n$ of the reply candidates associated with each question is employed. Alternatively, the number of the reply candidates of all the questions (the question concerned is also included) included in the path including the question may be employed. In this case, $S_d$ (Q) is calculated by the following equation.

$$S_d(Q) = \alpha \prod_{k=1}^{n} 1/C_k \times \beta/Q_n \quad \text{<Expression 5>}$$

where $C_k$(s) is the number of the reply candidates to a question k and n is the total number of the questions (the question concerned is also included) included in a path including the question. For example, as for Q2 of FIG. 3, the total number of the questions in the path including Q2 is two of Q2 and Q4, the number of the reply candidates about Q2 is one, and the number of the reply candidates about Q4 is three; therefore, $S_d$ (Q) becomes $\alpha/3 \cdot \beta/2$.

Third Embodiment

Next, a control device of the third embodiment will be explained. The control device of the third embodiment also has a dialog with a user by presenting a question in order to clarify the operation intention of the user. When a dialog is canceled by the user in the middle of the dialog, it becomes impossible to arrive at the result which the user finally intends. Therefore, the question that causes the user to cancel the dialog cannot be said to be an appropriate question. Therefore, the question selector 26 of the control device of the third embodiment calculates data $S_q$ (Q) indicative of the lowness of probability that the dialog is canceled by a user, in addition to the data $S_a$ (Q) indicative of the degree of comfort. The basic structure of the control device of the third embodiment is the same as that of the control device of the first embodiment. Based on $S_a$ (Q) and $S_q$ (Q), a question is selected with the following equation.

$$Q = \operatorname{argmax}\{S_q(Q) + S_a(Q)\} \qquad \text{<Expression 6>}$$

where $S_q$ (Q) is calculated by the following equation.

$$S_q(Q) = \delta \Pi_{i=1}^{n}(1 - P_g^{\ i}(Q)) \qquad \text{<Expression 7>}$$

where δ is a predetermined coefficient value, $P_g$ (Q) is a probability of the cancel when a certain question is outputted to a user, i is the question number, and n is the total number of the questions (including the question concerned) included in a path including the question.

Figure 8:
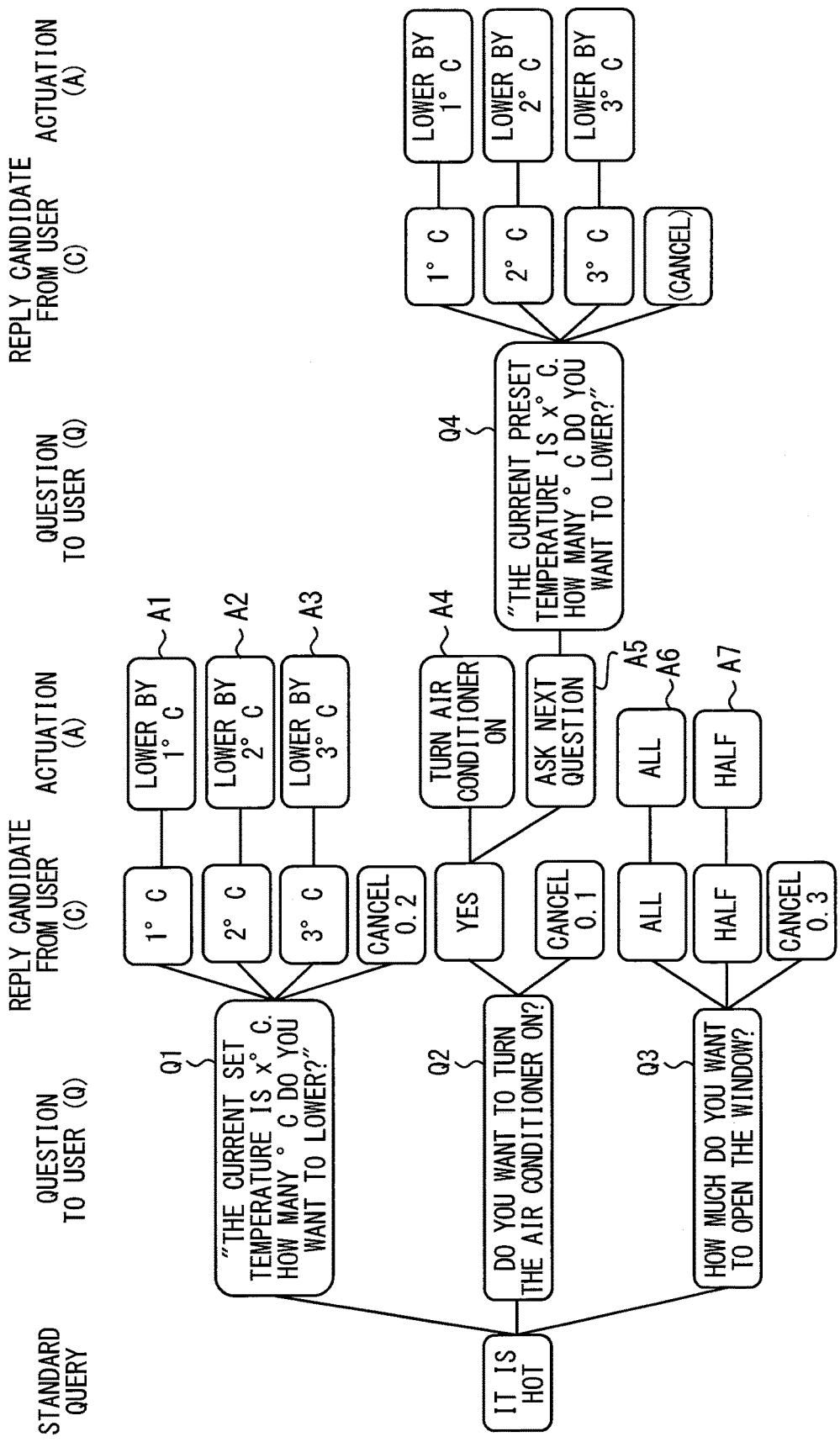
FIG. 8 is a drawing illustrating an example of a dialog model stored in a dialog model storage of a third embodiment.

FIG. 8 illustrates an example of a dialog model stored in a dialog model storage 31 of the third embodiment. As illustrated in FIG. 8, "cancellation" as a user reply candidate is included in the dialog model of the third embodiment. For example, when an answer to a question is "no", or when a reply corresponding to other reply candidates is not given from a user for a predetermined period of time from a question output, this is determined as "cancellation." The numeric character below each "CANCEL" denotes the probability ($P_g$ (Q)). Even when the same question is outputted, the cancellation probability may vary depending on the season and time zone at which the question is outputted. Therefore, the cancellation probability variable depending on a month of the year or on the time zone may be stored. Alternatively, each $P_g$ (Q) may be a fixed value. Alternatively, $P_g$ (Q) may be updated based on learning results of actual dialogs with users.

Figure 9:
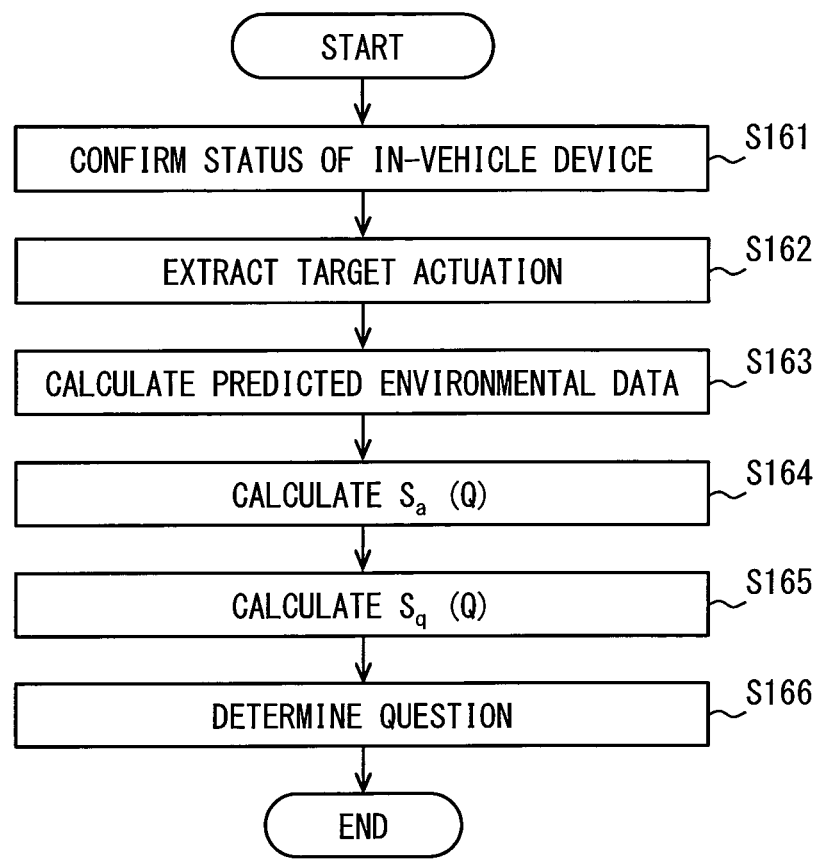
FIG. 9 is a flow chart illustrating the flow of query selecting by a control device of the third embodiment.

FIG. 9 illustrates the flow of query selecting processing in the third embodiment. The process from Step S161 to Step S164 is the same as in the first embodiment. The control device 1 of the second embodiment calculates $S_q$ (Q) at the subsequent Step S165, and selects a question Q at Step S166 based on $S_a$ (Q) and $S_q$ (Q).

For example, when it is assumed in the example of FIG. 8 that values of $S_a$ (Q) of A1 to A4, and A6 and A7 are 0.7, 0.8, 0.7, 0.8, 0.5, and 0.3, respectively, and that the cancellation probabilities to Q1, Q2, and Q3 are 0.2, 0.1, and 0.3, respectively, the sum of $S_a$ (Q) and $S_q$ (Q) for Q1, Q2, and Q3 becomes 0.8γ+0.8δ, 0.8γ+0.9δ, and 0.5γ+0.7δ. When α=β=1, 0.8γ+0.9δ becomes the greatest; therefore, Q2 is selected when the air conditioner is not on.

As explained above, the control device of the third embodiment calculates the data $S_q$ (Q) indicative of the lowness of the probability of the user cancellation, and selects a question Q based on $S_a$ (Q) and $S_q$ (Q). Accordingly, it is possible to guide the user to the operation of the in-vehicle device which makes the vehicle internal environment more comfortable, through the suitable dialog in accordance with the operation intention of the user.

In the third embodiment, a question Q is selected based on $S_a$ (Q) and $S_q$ (Q). Alternatively, a question may be selected based further on $S_d$ (Q). In this case, the question selection is made based on the following equation.

$$Q = \operatorname{argmax}\{S_d(Q) + S_a(Q) + S_q(Q)\} \qquad \text{<Expression 8>}$$

When $S_d$ (Q) is further used in this way, it becomes possible to select the question for guiding to an operation of providing a user-intended comfort without imposing a burden on the user.

The present disclosure can provide a control device, a control method, and a program in various ways.

In an example of the present disclosure, a control device for controlling at least one electronic device in response to an input query from a user comprising: an input query receiver that receives the input query from the user; a dialog model storage that stores a dialog model in which a question to the user, a reply candidate to the question from the user and a control content of each electronic device are associated with the input query; an environmental data acquirer that acquires environmental data in a surrounding of the user; an environment predicted data calculator that, based on the environmental data, calculates environment predicted data to predict environment in the surrounding of the user after elapse of a predetermined period of time in cases where each control content associated with the question corresponding to the input query and the reply candidate in the dialog model is executed; a question selector that, based on the environment predicted data, calculates data indicative of a degree of comfort of a surrounding environment of the user in cases where each control content is executed, and with reference to the dialog model stored in the dialog model storage, selects a question corresponding to the control content that maximizes the data indicative of the degree of comfort; an outputter that outputs the question selected by the question selector; and a control signal transmitter that transmits a control signal for instructing the electronic device to execute the control content according to a user's reply to the outputted question.

In this configuration, when an input query is received from a user, an actuation (control content) predicted to increase the comfort of the surrounding environment of a user is specified, and a question associated with the control content is selected and outputted to the user who has inputted the query. Then, the electronic device is operated in response to the user's reply to the outputted question. Usually, the user is considered to desire the surrounding environment to become comfortable. Accordingly, even if a clear operation instruction is not included in the input query by the user, the operation which makes the surrounding environment of the user more comfortable can be specified as the operation intention of the user to control the in-vehicle device. It should be noted that the environmental data is measurable data indicative of environment conditions, such as temperature, humidity, and a pollen concentration, for example, and that the environment predicted data is a predicted value of the environmental data. As for a concrete numerical value of the environmental data and environment predicted data, a degree of comfort for a human body in the environment condition can be evaluated by a numerical value.

In the control device, the data indicative of the degree of comfort may be calculated based on a distance between ideal environmental data stored in an ideal environmental data storage and each environment predicted data.

In this configuration, it is possible to objectively express the data indicative of the degree of comfort based on the distance between the ideal environmental data and the environment predicted data. Accordingly, it is possible to make a proper comparison on the degree of comfort and to select an appropriate question in order to make the surrounding environment of the user more comfortable.

In the control device, a plurality of ideal environmental data different on a season basis may be stored in the ideal environmental data storage, and the data indicative of the degree of comfort may be calculated based on a distance between the ideal environmental data selected on the season basis and the environment predicted data.

In this configuration, even if the same environment predicted data is calculated, the calculated indicative of the degree of comfort can differ from season to season. Accordingly, it is possible to highly accurately specify the control contents with which the environment of the surrounding of a user becomes comfortable, and it is possible to select a more appropriate question.

In the control device of the present disclosure, a plurality of ideal environmental data different on a user basis may be stored in the ideal environmental data storage, and the data indicative of the degree of comfort may be calculated based on the distance between the ideal environmental data selected on the user basis and the environment predicted data.

In this configuration, even if the same environment predicted data is calculated, the calculated indicative of the degree of comfort can differ from user to user. Accordingly, it is possible to highly accurately specify the control contents with which the environment of the surrounding of a user becomes comfortable, and it is possible to select a more appropriate question.

The control device may further comprise a control status confirmation unit that confirms a control status of the electronic device. Based on the control status, the question selector may specify the control content instructable to the electronic device in the dialog model stored in the dialog model storage, and the environment predicted data calculator may calculate the environment predicted data regarding the control content specified by the question selector.

In this configuration, questions corresponding to the control content extracted based on the control status of an electronic device are used for selecting a question. Accordingly, it is possible to exclude an inappropriate question in the status of the electronic device, and it is possible to output a more appropriate question to a user.

The control device may further comprise an input query convertor that converts the input query into a command for controlling the electronic device. The question selector may select a question to be outputted to the user, when the input query convertor cannot convert the input query into the command.

A case where the input query by a user is convertible into a command is rephrased as a case where the clear operation intention of the user is included in the input query. That is, in this configuration, only when the operation intention of a user cannot be clarified, a dialog with a user is performed. Accordingly, it is possible to reduce the burden on the user for the device control.

In the control device, the question selector may calculate data indicative of user's reply simplicity to each question and selects the question corresponding to the control content that maximizes a sum of the data indicative of the degree of comfort and the data indicative of the reply simplicity.

In this configuration, a question to which a user can reply simply is selected. Being simple to reply means that the burden imposed on the user when replying to the outputted question is small. Therefore, in this configuration, it is possible to control the device so as to make the surrounding environment more comfortable through a dialog, without imposing a burden on the user.

In the control device, the data indicative of the reply simplicity may be calculated based on the number of reply candidates to each question.

Generally, it is conceivable that as the number of reply candidates is smaller, the user can reply more easily to the question. Therefore, in this configuration, it is possible to calculate the data indicative of the reply simplicity and to select the question, simply and exactly.

In the control device, the data indicative of the reply simplicity may be calculated based on the number of dialogs with the user in the dialog model.

A question which leads to the repeated dialog with a user is considered to be complicated for a user and not easy to reply. Therefore, in this configuration, it is possible to calculate the data indicative of the reply simplicity and to select the question, simply and exactly.

In the control device, the reply candidate may include cancellation of the dialog for controlling the electronic device, and the dialog model may store a probability of the cancellation and the question in association with each other, and the question selector may calculate data indicative of lowness of the probability of the cancellation, and select the question corresponding to the control content that maximizes a sum of the data indicative of the degree of comfort and the data indicative of the lowness of the probability of the cancellation.

It is conceivable that a reason why the dialog for control of an electronic device is canceled is that the question outputted to the user has not been appropriate. Therefore, by selecting a question based on the cancellation probability, it is possible to guide the user to the operation of the in-vehicle device which makes the surrounding environment more comfortable, through the suitable dialog in accordance with the operation intention of the user.

In another example of the present disclosure, a control device for controlling at least one electronic device in response to an input query from a user comprises: an input query receiver that receives the input query from the user; a dialog model storage that stores a dialog model in which a question to the user, a reply candidate to the question from the user including cancellation of the dialog for controlling the electronic device, and a control content to each electronic device are associated with the input query; an environmental data acquirer that acquires environmental data in a surrounding of the user; an environment predicted data calculator that, based on the environmental data, calculate environment predicted data to predict environment in the surrounding of the user after elapse of a predetermined period of time in cases where each control content associated with a question corresponding to the input query and the reply candidate in the dialog model is executed; a question selector that calculates data indicative of a degree of comfort of the surrounding environment of the user in cases where each control content is executed, based on the environment predicted data, data indicative of reply simplicity to each question from the user, and data indicative of lowness of probability of the cancellation stored in the dialog model in association with the question, and that selects a question corresponding to the control content that maximizes a sum of the data indicative of the degree of comfort, the data indicative of the reply simplicity, and the data indicative of the lowness of the probability of the cancellation; an output unit that outputs the question selected by the question selector; and a control signal transmitter that transmits a control signal for instructing the electronic device to execute the control content according to a user's reply to the outputted question.

In this configuration, the question to be presented to a user is determined by comprehensive evaluation of different indices including the degree of comfort of the surrounding environment of the user, the reply simplicity to the question, and the probability of the cancellation of the dialog. Accordingly, it is possible to highly accurately determine appropriateness of the question to be presented to the user.

In an aspect of the present disclosure, a control method for controlling at least one electronic device in response to an input query from a user comprises the steps of: receiving the input query from the user; acquiring environmental data in a surrounding of the user; based on the environmental data, calculating environment predicted data to predict environment in the surrounding of the user after elapse of a predetermined period of time in cases where each control content o is executed, wherein a dialog model storage stores a dialog model in which a question to the user, a reply candidate to the question, and the control content are associated with the input query; based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage; outputting the question selected by the question selector; and transmitting a control signal for instructing the electronic device to execute the control content according to a user's reply to the outputted question.

In this method, it is possible to specify an operation intention of the user through a suitable dialog, and to control the electronic device to make the surrounding environment of the user more comfortable. It is also possible to apply each configuration of the control device described above to the control method in the present disclosure.

In an aspect of the present disclosure, a program causes a computer to execute the following steps for controlling at least one electronic device in response to an input query by a user: receiving the input query from the user; acquiring environmental data in a surrounding of the user; based on the environmental data, calculating environment predicted data to predict environment in the surrounding of the user after elapse of a predetermined period of time in cases where each control content of the electronic device is executed, wherein a dialog model storage stores a dialog model in which a question to the user, a reply candidate to the question, and the control content are associated with the input query; based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage outputting the question selected by the question selector; and transmitting a control signal for instructing the electronic device to execute the control content according to a user's reply to the outputted question.

In this program, it is possible to specify an operation intention of the user through a suitable dialog, and to control the electronic device to make the surrounding environment of the user more comfortable. It is also possible to apply each configuration of the control device described above to the program described above. The program described above may be provided in a form stored in a computer-readable non-transitory storage medium or provided via a telecommunication line.

According to the above described control device, control method and program, the control content for improving the comfort of the surrounding environment of a user is specified, and a question associated with the control content is selected and outputted to the user who has inputted the query. Therefore, it is possible to specify the operation intention of the user through the dialog, and to control the electronic device so that the surrounding environment of the user becomes more comfortable.

The embodiments and the configurations of the present disclosure have been illustrated in the above; however, the embodiments and the configurations in the present disclosure are not restricted to each of the embodiments and each of the configurations described above. The embodiments and the configurations which are obtained by combining suitably the technical components disclosed respectively in the different embodiments and configurations are also within the scope of the embodiments and the configurations of the present disclosure.

The invention claimed is:

1. A control device for controlling at least one electronic device in response to an input query from a user, the control device comprising:
   an input query receiver that receives the input query from the user;
   a dialog model storage that stores a dialog model in which a question to the user, a reply candidate to the question from the user and a control content of each electronic device are associated with the input query;
   an environmental data acquirer that acquires environmental data in a surrounding of the user;
   an environment predicted data calculator that, based on the environmental data, calculates environment predicted data to predict environment in the surrounding of the user after elapse of a predetermined period of time in cases where each control content associated with the question corresponding to the input query and the reply candidate in the dialog model is executed;
   a question selector that,
      based on the environment predicted data, calculates data indicative of a degree of comfort of a surrounding environment of the user in cases where each control content is executed, and
      with reference to the dialog model stored in the dialog model storage, selects a question corresponding to the control content that maximizes the data indicative of the degree of comfort;
   an outputter that outputs the question selected by the question selector; and
   a control signal transmitter that transmits a control signal for instructing the electronic device to execute the control content according to a user's reply to the outputted question.

2. The control device according to claim 1, wherein
   the data indicative of the degree of comfort is calculated based on a distance between an ideal environmental data stored in an ideal environmental data storage and each environment predicted data.

3. The control device according to claim 2, wherein
   a plurality of ideal environmental data different on a season basis are stored in the ideal environmental data storage, and
   the data indicative of the degree of comfort is calculated based on a distance between the ideal environmental data selected on the season basis and the environment predicted data.

4. The control device according to claim 2, wherein
a plurality of ideal environmental data different on a user basis are stored in the ideal environmental data storage, and
the data indicative of the degree of comfort is calculated based on the distance between the ideal environmental data selected on the user basis and the environment predicted data.

5. The control device according to claim 1, further comprising:
a control status confirmation unit that confirms a control status of the electronic device,
wherein
depending on the control status, the question selector specifies, the control content instructable to the electronic device in the dialog model stored in the dialog model storage, and
the environment predicted data calculator calculates the environment predicted data regarding the control content specified by the question selector.

6. The control device according to claim 1, further comprising:
an input query convertor that converts the input query into a command for controlling the electronic device,
wherein
the question selector selects a question to be outputted to the user, when the input query convertor cannot convert the input query into the command.

7. The control device according to claim 1, wherein
the question selector calculates data indicative of user reply simplicity to each question and selects the question corresponding to the control content that maximizes a sum of the data indicative of the degree of comfort and the data indicative of the reply simplicity.

8. The control device according to claim 7, wherein
the data indicative of the reply simplicity is calculated based on the reply candidate to each question.

9. The control device according to claim 7,
wherein the data indicative of the reply simplicity is calculated based on the dialog model.

10. The control device according to claim 1, wherein
the reply candidate includes cancellation of the dialog for controlling the electronic device, and the dialog model stores a probability of the cancellation and the question in association with each other, and
the question selector calculates data indicative of lowness of the probability of the cancellation, and selects the question corresponding to the control content that maximizes a sum of the data indicative of the degree of comfort and the data indicative of the lowness of the probability of the cancellation.

11. A control device for controlling at least one electronic device in response to an input query from a user, the control device comprising:
an input query receiver that receives the input query from the user;
a dialog model storage that stores a dialog model in which a question to the user, a reply candidate to the question from the user including cancellation of the dialog for controlling the electronic device, and a control content to each electronic device are associated with the input query;
an environmental data acquirer that acquires environmental data in a surrounding of the user;
an environment predicted data calculator that, based on the environmental data, calculate environment predicted data to predict environment in the surrounding of the user after elapse of a predetermined period of time in cases where each control content associated with a question corresponding to the input query and the reply candidate in the dialog model is executed;
a question selector that
calculates data indicative of a degree of comfort of the surrounding environment of the user in cases where each control content is executed, based on the environment predicted data, data indicative of the reply simplicity to each question from the user, and data indicative of lowness of probability of the cancellation stored in association with the question in the dialog model, and
selects a question corresponding to the control content that maximizes a sum of the data indicative of the degree of comfort, the data indicative of the reply simplicity, and the data indicative of the lowness of the cancellation probability;
an output unit that outputs the question selected by the question selector; and
a control signal transmitter that transmits a control signal for instructing the electronic device to execute the control content according to a user's reply to the outputted question.

12. A control method for controlling at least one electronic device in response to an input query from a user, the control method comprising:
receiving the input query from the user;
acquiring environmental data in a surrounding of the user;
based on the environmental data, calculating environment predicted data to predict environment in the surrounding of the user after elapse of a predetermined period of time in cases where a control content of each electronic device is executed, wherein a dialog model storage stores a dialog model in which a question to the user, a reply candidate to the question, and the control content are associated with the input query;
based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage;
outputting the question selected by the question selector; and
transmitting a control signal for instructing the electronic device to execute the control content according to a user's reply to the outputted question.

13. A computer-readable non-transitory storage medium storing a program for controlling at least one electronic device in response to an input query by a user, the program causing a computer to execute:
receiving the input query from the user;
acquiring environmental data in a surrounding of the user;
based on the environmental data, calculating environment predicted data to predict environment in the surrounding of the user after elapse of a predetermined period of time in cases where each control content of the electronic device is executed, wherein a dialog model storage stores a dialog model in which a question to the user, a reply candidate to the question, and the control content are associated with the input query;
based on the environment predicted data, calculating data indicative of a degree of comfort of the surrounding environment of the user in cases where each control content is executed, and selecting a question corresponding to the control content that maximizes the data indicative of the degree of comfort with reference to the dialog model stored in the dialog model storage;
outputting the question selected by the question selector; and
transmitting a control signal for instructing the electronic device to execute the control content according to a user's reply to the outputted question.

\* \* \* \* \*